Inventor
Gerrit Den Besten
Attorneys

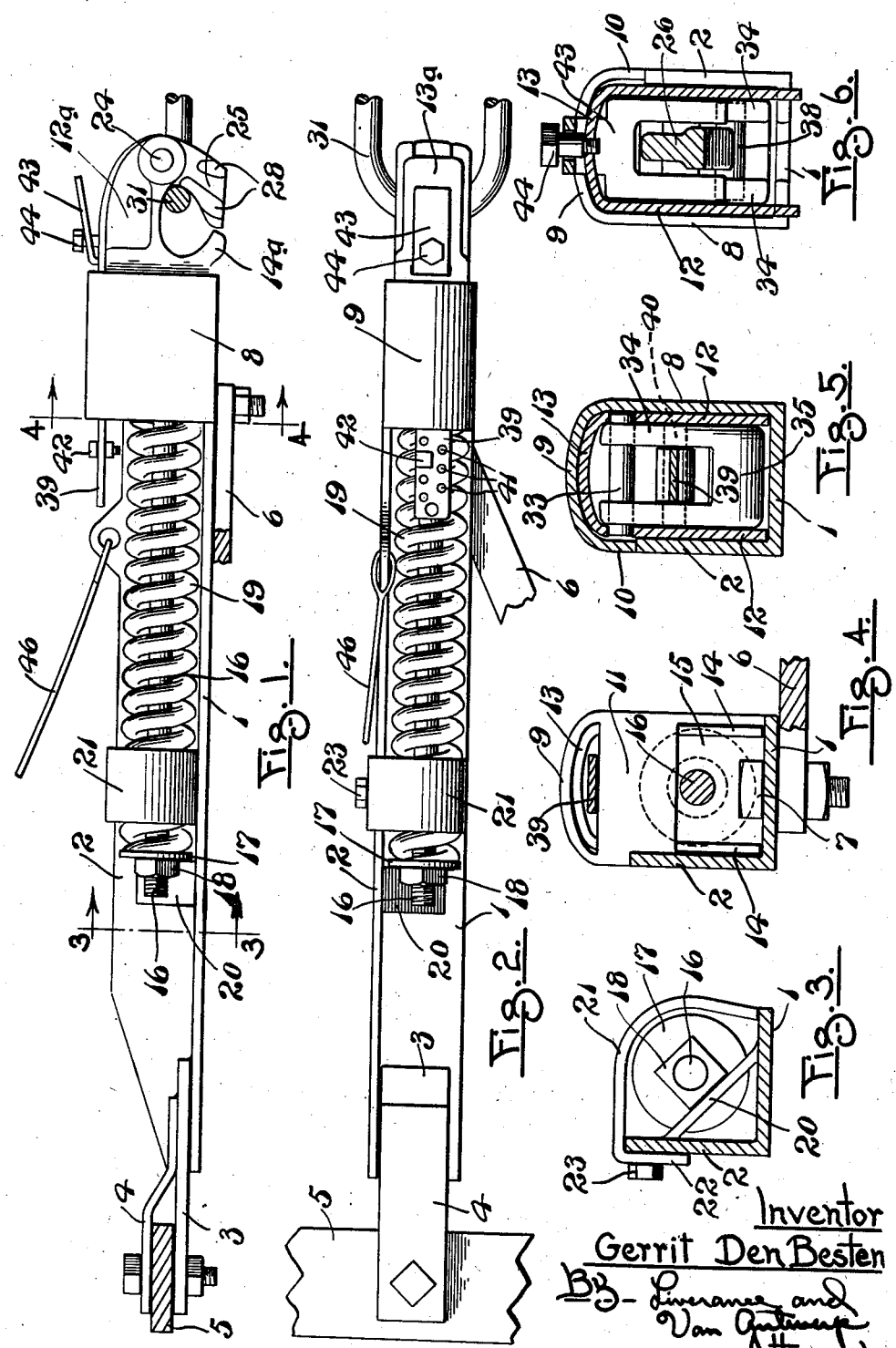

Patented Sept. 12, 1944

2,358,217

UNITED STATES PATENT OFFICE 2,358,217

CUSHION RELEASE HITCH

Gerrit Den Besten, Zeeland, Mich.

Application March 23, 1942, Serial No. 435,810

13 Claims. (Cl. 280—33.16)

This invention relates to a cushion release hitch of the general type and character used to make a releasable connection between a power implement such as a tractor and a drawn implement, for example, a plow or gangplow. Hitches of a releasable character have been used between tractors and plows or between tractors or trucks and other implements drawn thereby, built to automatically release upon the building up or occasion of an extraordinary force which causes the tractor or implement to be subjected to what would be an overstrain if a release of the two was not quickly and readily accomplished. One common example of this is when a plow strikes an obstruction in the ground. If there was not a release of the plow and tractor drawing it there would be great danger of breakage. Many hitches previously used have been subjected to excessive wear in parts thereof which causes them to become unusable after a relatively small length of time in service. One of the very desirable objects of my invention is that the novel hitch of my invention shall greatly reduce such wear, in fact substantially eliminate it, so that the life of the hitch is very much prolonged.

A further object of the invention is to produce a hitch which is very strong and otherwise durable, readily and economically manufactured and assembled, and easily handled in its use and operation and in the connection of the tractor and drawn implement.

A still further object of the invention is to provide a wide range of adjustment of the hitch structure in a very simple manner so that the force required to automatically release the hitch may be varied between widely spaced maximum and minimum amounts with adjustment to many positions for release of the hitch between such maximum and minimum amounts. At the same time the hitch when once adjusted will release quickly, in fact it may be said instantaneously upon attaining the releasing force to which the adjustment is made. The parts are in effect very securely locked together until the tractive force between the tractor and the implement drawn reaches a required amount, whereupon the hitch is substantially instantaneously released.

A still further object and purpose of the invention is to provide simple, manually operable means for releasing the hitch when desired.

Many other objects and purposes than those specifically stated, but which will be hereinafter pointed out, will appear as an understanding of the invention is had from the following description, taken in connection with the accompanying drawings, in which, Fig. 1 is a side elevation of the hitch in closed operative condition.

Fig. 2 is a plan view thereof.

Figs. 3 and 4 are transverse sections enlarged, taken substantially on the planes of lines 3—3 and 4—4 of Fig. 1, looking in the direction indicated by the arrows.

Figs. 5 and 6 are transverse vertical sections substantially on the planes of lines 5—5 and 6—6 of Fig. 8, likewise looking in the arrow indicating directions.

Like reference characters refer to like parts in the different figures of the drawings.

Figure 7:
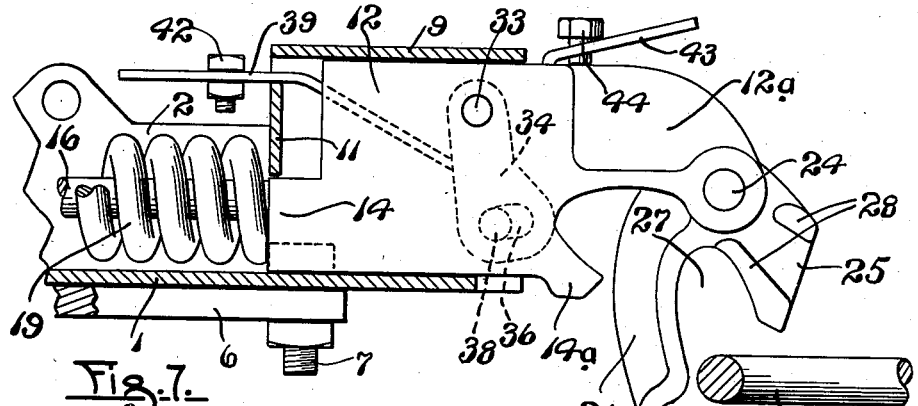
Fig. 7 is a fragmentary partial side elevation and vertical section of the hitch in its released position.

The embodiment of my invention, as illustrated in the drawings, includes a main body member of angle formation having a bottom leg 1 and a vertical leg 2 extending upwardly from one side thereof. This member, preferably of rolled steel, at its rear end has means for connection with the implement drawn, including a horizontal plate 3 welded or otherwise permanently secured to the bottom leg 1 and with a hasp 4 connected at one end portion to the plate 3 and thence extending upwardly and thereover, between which a bar 5 of the implement to be drawn may be positioned and a bolt passed downwardly through the parts 3, 4 and 5. A stabilizing bar 6 may be connected by a bolt 7 to and at the under side of the bottom leg 1 toward its front end, extending therefrom outwardly and rearwardly at an angle to connect at its rear end of the bar 5. The bolt 7 has a head which lies above the bottom leg 1 (Fig. 8) at the back part of the housing member about to be described.

The housing member is made from a plate of steel with a vertical side 8, a curved top 9 and a short leg 10 (Fig. 5). It is located so that the lower edge portion of the leg 8 comes against and is welded to the free edge of the bottom leg 1; while the lower edges of the short leg 10 engage against and are welded to the upper edges of the vertical leg 2 of the first described member. Such housing is located over the front end portion of the angle body member, as shown. A vertically positioned cross plate 11 is at the rear end of the housing, extending between the parts 8 and 10 and welded thereto (Fig. 4) with a space or opening between the upper edge of the plate 11 and the upper side 9 of the housing.

Figure 9:
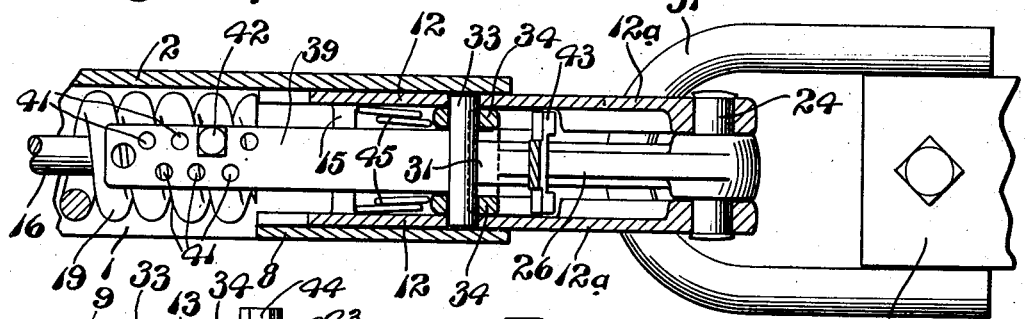
Fig. 9 is a fragmentary horizontal longitudinal section through the hitch on a plane below the tops of the hereinafter described housing and carrier members.

Within this housing and slidable for a limited distance lengthwise thereof is a carrier for the immediate hitch members. Such carrier in cross section is of inverted U-shape having two sides 12 and an upper curved connecting top 13 which is immediately below the top 9 of the housing, the sides 12 lying within the leg 8 at one side and the short leg 10 and the vertical leg 2 of the first described member at the other side (Fig. 9). The carrier extends forward of the housing, the sides at their upper portion being forwardly extended, as at 12a, and the top extended and curved downwardly for a short distance as indicated at 13a. Each of the vertical sides 12 at its lower portion has a rearwardly projecting extension 14, the upper edges thereof lying immediately below the lower edge of the cross plate 11 of the housing. The lower front corner portions of the sides 12 are extended downwardly and outwardly as shown at 14a (Fig. 7) below the upper forward extensions 12a. Toward the rear of the carrier but located a distance forward of the rearward extensions 14, a cross bar 15 is positioned and permanently secured as by welding to the sides 12 of the carrier and extending between them. The bar 15 is of sufficient cross sectional area that it has great strength.

A rod 16 is passed to the rear through an opening in the bar 15. Rod 16 at its forward end is equipped with a head which comes against the front side of the bar 15 and extends rearwardly over the bottom leg 1 of the angle member and is threaded at its end. A washer 17 is placed over the rear end portion of the rod and a nut 18 screwed on the rod against the rear side of the washer. A heavy coiled compression spring 19 is located around rod 16 between said washer 17 at its rear end and the back plate 11 of the housing and the head of the bolt 7 at its front end.

It is of course to be understood that such head of the bolt 7 is used because the bolt is thus available for both a bearing for one end of the spring 19 and for connecting the bar 6 in place. But the bar 6 may be attached, if it is used, in other ways, and the head of the bolt 7 in such case replaced by an equivalent lug or other abutment located and secured in substantially the same position.

It is obvious that the spring 19 may be initially compressed to a greater or less degree by an adjustment of the nut 18. A bar 20 is placed in an angular position (Fig. 3) between the legs 1 and 2 of the angle member described and welded at its ends to said legs serving as a lock against undesired turning movement of the nut 18. To hold the parts in position a guard plate 21 has a lower edge thereof coming against the upper side of the leg 1, extends upwardly and is curved to pass over the spring 19 and the upper edge of the leg 2, and provided with a downturned flange 22 through which a set screw 23 may pass and thread into a suitable opening in leg 2. This guard is located toward the rear end of the spring 19. It may be removed by removing the set screw 23 if at any time it is desired to repair or replace the rod 16 and the spring 19 or to adjust the position of the nut 18. The position of the bar 15 and the carrier to which it is connected relative to the housing in which the carrier is mounted varies in accordance with the adjustment of the nut 18. Normally the bar 15 in the operative position of the hitch (Fig. 8) should be a short distance ahead of the stop or abutment provided by the head of bolt 7.

A pin 24 is mounted on and extends between the front end portions of the sides 12a of the carrier, which sides are ribbed for reinforcement. On the pin 24 a clevis holding member is rotatably mounted. It has two integral arms 25 and 26, the pivot being substantially at their juncture and the arms diverging and separated by a clevis receiving space 27. The forward arm 25 at its sides is provided with spaced laterally extending lugs 28 the purpose of which will be hereinafter described. The free end of the rear arm 26 is provided with a concaved seat or socket 29 and terminates in a terminal lip 30 as shown.

To engage with the rotatably mounted clevis holding member a clevis 31 of U-form is connected with the draw bar 32 of a tractor. In the operative position (Fig. 8) the clevis is in the recess at 27 below the arm 26 and back of the arm 25. The clevis holding member is held in the position shown until automatically disengaged, and it is evident that the line of force of the clevis in such position is located a short distance below the axis of the pin 24 so that when the clevis holding member is released it will be turned in a counter-clockwise direction, the clevis releasing therefrom, as in Fig. 7.

A latching member for the clevis holding member is pivotally suspended from a cross pin 33 located near the upper side 13 and approximately half way between the front and rear ends of the carrier. The latch member comprises two spaced sides 34 depending from the pin connected by an integral cross piece 35 at the lower rear corner portions of the sides, the front side of which is of a curved form providing a socket similar to the socket 29. The lower ends of the sides 34 are each provided with substantially horizontal slots 36 which preferably at their lower sides and between their ends are slightly raised to make a curved hump 37. A roller 38 extends between said sides 34 and has its ends received in the slots. Said roller has free movement and may traverse the slots the limited distance provided from one end thereof to the other.

A trip bar 39 of flat metal is connected at its front end to a pin 40 which extends between the sides 34 of the latching member above the cross bar 35. The bar extends upwardly and to the rear and is then bent to extend horizontally back of the carrier and back of the carrier housing through the opening above the rear end 11 of the housing, resting on the upper edge of said end 11. The trip bar 39 back of the housing is provided with a series of spaced holes 41 in any one of which a bolt 42 may be placed and secured. The position of the bolt on the trip bar will govern the tripping of the latch, the closer the bolt is to the forward opening 41, the quicker the latch will be tripped to release the clevis holding member.

A bent lever 43 is mounted for pivotal movement at the upper side of the carrier in front of the housing, having downwardly extending arms which engage against the front edges of the sides 34 of the latching member toward their lower ends. The bent lever is pivotally held in position by a screw as at 44 passing through it and being connected with the upper side 13 of the carrier. Downward pressure on the upper forwardly extending arm of the bent lever will turn the latching member to the rear about its pivot pin 33 against the force of light springs 45 which are interposed between the sides 34 of the latching member and the cross bar 15 on the carrier. It is the function of the springs 45 to normally swing the lower end of the latching member to a forward position.

Figure 8:
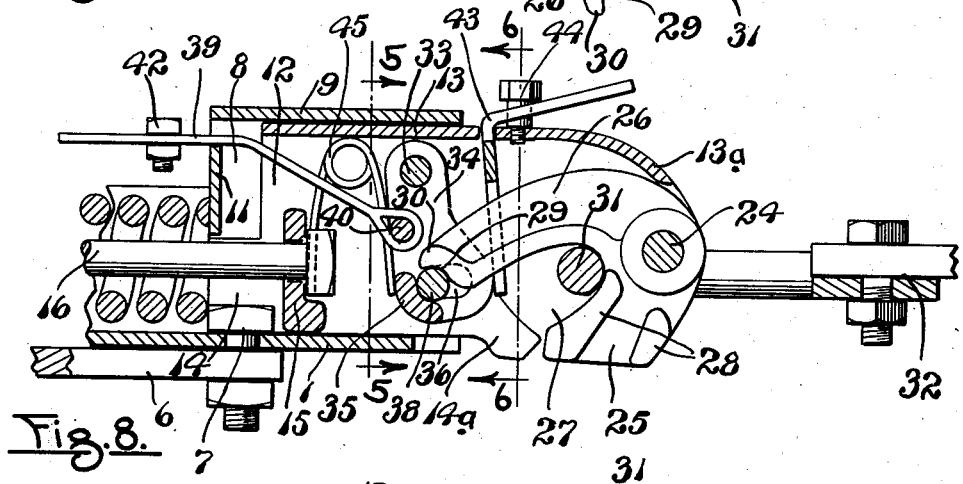
Fig. 8 is a fragmentary longitudinal vertical section taken substantially midway between the sides of the hitch in its operative or locked position.

In operation, with the tractor clevis 31 connected with the hitch as in Fig. 8, the roller 29 is at the rear ends of the slots 36 and is between the free end of the arm 26 and the cross bar 35 of the latching member. The latching member is held in its forward position by the springs 45, and any pull by the tractor transmitted through the clevis, the tendency of which is to cause the clevis engaging member to turn counter-clockwise, results in gripping the roller 38 more snugly between said arm 26 and bar 35.

The spring 19 will be compressed under load, the carrier and the parts associated therewith begin moved forward with reference to the housing in which it is telescopically received an amount equal to the spring compression. Under normal conditions of pulling the compression of the spring will not be sufficient that the bolt at 42 will come to the back plate 11 of the housing and connection of the tractor and implement drawn thereby is securely maintained under all normal conditions.

Figure 10:
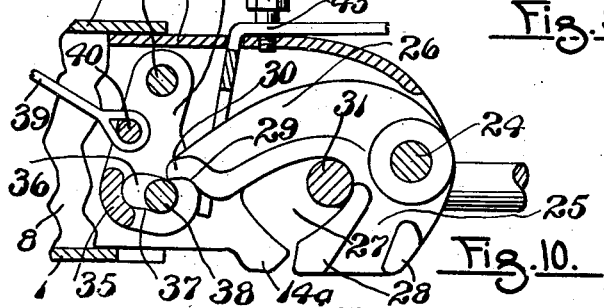
Fig. 10 is a view similar to Fig. 8 showing the hitch substantially at the time that it is to be released under the application of sufficiently greater than normal pulling force.

Upon the production of an excessive pull between the tractor and the drawn implement, for example, if the drawn implement is a plow and it should hit a solid obstruction in the ground, the spring 19 will be compressed much farther bringing the bolt 42 against the rear end of the housing. Then with the continued forward movement of the carrier the latching member will be held against moving with said carrier at its lower end and will be turned relative to the carrier substantially to the position shown in Fig. 10. The roller 38 traverses the slots 36 until the forward end thereof is reached and thereafter with continued forward movement of the carrier the terminal lip 30 of the upper arm 36 of the clevis holding member will pass over and beyond the roller and thereupon is swung to the position shown in Fig. 7 with a disconnection of the clevis from the hitch.

Upon the disconnection occurring, spring 19 being released will pull the carrier back into the housing. Instead however, of the bar 15 striking solidly against the stop or abutment provided by the head of the bolt 7, the projecting rear end portions 14 of the sides 12 of the carrier come against the front end of the spring 19 and serve to cushion the blow of striking of said bar 15 against the stop.

In practice a cable or line 46 may be attached to an upwardly extending ear on the vertical leg 2 of the hitch support and lead to the drawn implement and fastened thereto to prevent the forward end of the hitch dropping down to the ground when release takes place. For reconnection the tractor is backed to position so that the clevis occupies substantially the position or a little farther back than shown in Fig. 7, the hitch being lifted to a position above that normally occupied when connected with the clevis, and then the forward end of the hitch lowered to engage with the clevis and turn the clevis holding member in a clockwise direction. As the clevis holding member moves back to its latched position, it will force the roller 38 and its pivoted carrying member backward by camming action against the light springs 45 until it has moved upward sufficiently to permit the roller 38 to come into place beneath it.

It is of course evident that disengagement of the tractor and drawn implement may be obtained at will at any time by downward pressure upon the upper arm of the bent lever 43 forcing the latch to the rear.

A particularly important feature of this construction is the complete elimination of wear during normal pulling. The latch parts per se which are under strain are mounted in the carrier and move as a unit therewith during the cushioning action in which the spring 19 compresses. The carrier slides in the housing by this pulling load does not impose frictional resistance to this movement because both the action of the spring 19 and the pulling load are in alinement with the movement of the carrier in the housing. Furthermore, wear on the latch parts is reduced to a minimum because when the unlatching occurs the end of the arm 26 rolls on the roller 28 and the roller rolls in the slots 36 thereby eliminating wear caused by sliding engagement.

The lugs at 28 serve as supports for the sides of the clevis on sharply turning the tractor with reference to the hitch, particularly the forward lugs 28 support one side or the other of the clevis, depending upon the direction of turning, and hold it from camming downwardly underneath the forward downwardly curved edge of the arm 25 of the clevis holding member.

The construction is economical to produce, being made largely from steel which is readily formed and fabricated and welded together. The clevis holding member and the latch are cast. The hump at 37 while not necessarily essential to the working of the hitch, serves in a measure to retard the forward rolling of the roller 38 and avoid disconnections of the hitch such as might occur when an obstruction was struck, but was overcome and passed, causing the development of greater than normal pulling force between the tractor and the drawn element but not a force so great as to cause breakage or other damage. From a practical standpoint automatic disconnection of the hitch is not to take place with every obstruction which may be hit by the drawn implement but only when so solidly hit and held that continuing forward movement of the tractor would break or otherwise seriously damage something on either the tractor, the hitch or the drawn implement.

The invention set forth is capable of wide variations in detail of design and is not to be limited to the specific embodiment shown.

The claims appended hereto define the invention which is to be considered comprehensive of all forms of structure coming within their scope.

I claim:

1. In combination, an elongated supporting member having a housing at its front end, a carrier slidably mounted within said housing and projecting therefrom, a hitch member pivotally mounted on the carrier, a latch mounted on the carrier releasably engageable with the hitch member to hold it in operative position, yieldable spring means normally holding the carrier in a rearward position, said means yielding on pulling force applied to said hitch member, and a trip connected with the latch for automatically releasing it from the hitch member upon application of pulling force to the hitch member and compression of the spring with resultant movement of the carrier in the housing sufficient to cause operative action on the trip to release the latch.

2. In a structure of the class described, an elongated supporting member, a housing at one end of the supporting member open at its outer end and partly closed at its inner end, a carrier slidably mounted in the housing for movements in the direction of the length of the supporting member, said carrier having spaced apart sides, a bar connecting said sides at the rear portion of the carrier, a headed rod passing through said bar, a coiled spring around said rod, means at the outer end of the rod engaging with said spring, the other end of said spring bearing against the housing, a hitch member pivotally mounted at the outer end of the carrier, a pivotally mounted latch for said hitch member to hold it in operative position, a trip connected to said latch and extending back of the housing, and an abutment on said trip bar back of the housing adapted to be brought against the housing on outward movement of the carrier and compression of said spring.

3. A construction containing the elements in combination defined in claim 2, combined with means for adjustably mounting said abutment on the trip member to vary the distance of forward movement of the carrier before the abutment engages said housing.

4. The elements in combination defined in claim 2, combined with manually operable means mounted on the outer portion of said carrier and engaging against the latch for moving said latch away from the hitch member to release it.

5. In a structure of the class described, an elongated supporting member, a housing at an end thereof having spaced apart sides and a top connected with said supporting member, the housing being open at its front end, a plate partly closing the rear end of the housing, an abutment carried by the supporting member at the lower rear portion of the housing, a carrier inserted in the open outer end of the housing and slidable back and forth therein, said carrier having spaced apart sides and a top connecting them, a bar extending between the sides of the housing toward the rear thereof, a rod having a head at its forward end passing through said bar and lying over the supporting member, a coiled compression spring around said rod engaging at one end against said rear housing plate and abutment, a washer and nut on the rear end of the rod, a hitch member comprising two integral arms spaced from each other at their free end portions, means for pivotally mounting said hitch member substantially at the juncture of said arms on the outer end of said carrier, a latch pivotally supported by and depending from said carrier between its sides, and a roller carried by said latch adapted to engage with one end of one of said arms of the hitch member and be seated against the latch for holding the hitch member in operative position.

6. A construction containing the elements in combination defined in claim 5, combined with spring means between said latch and the bar carried by said carrier for normally moving the latch in a direction toward the hitch member.

7. A construction containing the elements in combination defined in claim 5, said latch including two spaced apart depending sides and a bar having a curved socket at its forward side connecting the lower inner corner portions of said sides, said sides of the latch being slotted outwardly from said bar, the roller at its ends being received in said slots, and the arm of the hitch member with which the roller engages at its end having a concave socket to engage the roller.

8. A construction containing the elements in combination defined in claim 5, said latch having two spaced apart sides, a rod between said sides between the upper and lower ends thereof, a trip bar connected with said rod extending over the back plate of the housing and to the rear thereof, and a member connected with said trip bar back of the housing and adjustable to different positions thereon which is drawn to engage with the back of the housing on outward movement of the carrier and compression of the spring a predetermined distance.

9. A hitch comprising an elongated supporting member of angle form having a horizontal bottom leg and a vertical leg at one side thereof, a substantially U-shaped housing at one end of the supporting member having a vertical side parallel to and spaced from the vertical leg of the supporting member and having a top extending toward and coming to said vertical leg and permanently connected therewith, said housing being open at its outer end, a carrier inserted in the open outer end of the housing having a top and spaced apart depending sides, a hitch member pivotally mounted at the outer end of the carrier between its sides, a pivotally mounted latch carried by and between and depending downwardly within the sides of said carrier, said latch being adapted to engage the hitch member and hold it in operative position, a back plate across the inner end of the housing partially closing said housing, a bar extending between the sides of the carrier, a headed rod passing through said bar and lying over the bottom leg of the supporting member, a coiled spring around the rod engaging at one end against the back plate of the housing, a washer and nut at the free end of the rod, and means to trip the latch and free the hitch member on forward movement of the carrier and compression of the spring a predetermined distance.

10. A construction containing the elements in combination defined in claim 9, the sides of said carrier at their rear lower portions having rearwardly extending projecting portions adapted to pass underneath the back plate of the housing and engage against the adjacent end of said spring, as and for the purposes specified.

11. A releasable hitch comprising, an elongated angle bar support, a housing at the forward end of the support, a carrier slidably mounted in said housing and projecting from the forward end thereof, releasable hitch means mounted in said carrier, a rod connected to said carrier and extending rearwardly beyond said housing, a coil spring surrounding said rod and located within the angle portion of said support and bearing at its forward end against the housing, means at the rear end of said rod bearing against said spring, said spring compressing during forward movement of the carrier and means for releasing said hitch at a predetermined forward movement of the carrier.

12. The elements of claim 11 in combination combined with a guard plate passing over said spring near its rear end and extending between the outer edges of the respective sides of said angle bar.

13. The elements of claim 11 in combination combined with projections on the rear end of said carrier engageable with the forward end of said spring when the carrier is in retracted position.

GERRIT DEN BESTEN.